United States Patent Office 2,778,861
Patented Jan. 22, 1957

2,778,861

ALUMINUM CHLORIDE-CATALYZED REACTION OF TETRACHLOROMETHYLPROPANE

Donald G. Kundiger and Huey Pledger, Jr., Manhattan, Kans., assignors to The Dow Chemical Company, Midland, Mich., a corporation of Delaware No Drawing. Application March 11, 1953,
Serial No. 341,834

6 Claims. (Cl. 260—651)

This invention is concerned with 3-aryl-1,1-dichloro-2-methylpropenes and is particularly directed to a method for reacting 1,1,1,2-tetrachloro-2-methylpropane with certain aromatic compounds in the presence of aluminum chloride to produce 3-aryl-1,1-dichloro-2-methylpropenes. The latter compounds have been found valuable as toxic constituents of aqueous spray compositions for the control of insect and mite pests.

According to the present invention it has been discovered that 1,1,1,2-tetrachloro-2-methylpropane, having the formula

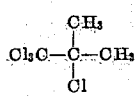

may be reacted with certain aromatic compounds in the presence of a catalytic amount of anhydrous aluminum chloride and at temperatures of from about 70° to 100° C. to produce 3-aryl-1,1-dichloro-2-methyl-1-propenes. The term "aromatic compound" as herein employed is particularly intended to include substituted benzenes capable of condensation with alkyl chlorides in the Friedel-Crafts reaction.

In carrying out the invention, the aromatic compound and catalyst are mixed together and heated to the reaction temperature and the 1,1,1,2-tetrachloro-2-methylpropane added thereto portionwise with stirring. At least one molecular proportion of aromatic compound is employed for each molecular proportion of tetrachloromethylpropane in the reaction and it is preferred to employ a considerable excess of the aromatic reactant, said excess serving as a reaction solvent. In the latter case, it is convenient to employ a portion of the excess aromatic reactant as a solvent for the tetrachloromethylpropane to facilitate the addition thereof. It is preferred to employ as the aromatic reactant a material which is liquid at the reaction temperature, however, higher melting aromatic compounds may be utilized by using a suitable inert solvent as the reaction medium.

The reaction proceeds with the evolution of hydrogen chloride and is conveniently carried out in a vessel lined with glass, porcelain, nickel, stainless steel or other material resistant to the corrosive action of hydrogen chloride. The reaction vessel may be vented into a trap or scrubber for the recovery of the hydrogen chloride evolved. The exact equipment is not critical and may range from a simple pot reactor to a system run on a continuous or semi-continuous basis with any unreacted portion of either organic reactant being recovered and recycled in the system.

The reaction proceeds satisfactorily at atmospheric pressures, although somewhat elevated or reduced pressures may be employed if desired.

The reaction is exothermic and the rate increases with increasing temperature. The reaction is initiated and proceeds rapidly when the reactants are brought together in the presence of the catalyst as set forth above and the rate may be controlled to a considerable extent by the rate of admixture of the reactants. While the reaction is operable at temperatures of from about 70° to 100° C., it is preferred to carry out the reaction at from about 90° to 100° C. Higher temperatures are to be avoided in order to minimize the formation of tarry by-products.

While any operable proportions of the aluminum chloride catalyst may be employed, the proportions of catalyst are critical for obtaining significant yields of 3-aryl-1,1-dichloro-2-methyl-1-propenes. Best yields have been obtained using not more than 0.1 mole and preferably from 0.01 to 0.1 mole of anhydrous aluminum chloride per mole of tetrachloromethylpropane in the reaction mixture. Higher proportions of aluminum chloride caused an undesirable increase in the formation of tarry by-products. Generally 0.01 to 0.04 mole of the aluminum chloride in relation to one mole of this tetrachloropropane was most effective.

The products of the reaction may be separated by conventional procedures. In one method of operation the reaction product is added to a mixture of crushed ice and a strong mineral acid to decompose the aluminum chloride catalyst, the resulting mixture separating into an aqueous layer and an oily organic layer. The organic layer is separated and the aqueous layer extracted with ether. The organic layer and ether extracts are combined and the ether recovered by distillation. The products of the reaction are then separated and unreacted starting materials recovered by fractional distillation under reduced pressure.

In a representative operation 2.6 grams (0.02 mole) of anhydrous aluminum chloride and 300 grams (2.66 moles) of chlorobenzene were mixed together and heated to a temperature of 90° to 99° C. To the resulting mixture 88 grams (0.5 mole) of 1,1,1,2-tetrachloro-2-methylpropane dissolved in 262.5 grams (2.33 moles) of chlorobenzene was added portionwise with stirring over a period of 1.25 hours. The reaction mixture was maintained at 90° to 99° C. throughout this period. The reaction mixture was then poured into a mixture of crushed ice and concentrated hydrochloric acid, the resulting mixture separating into an organic layer and an acidic aqueous layer. The organic layer was separated and the aqueous layer extracted with ether. The organic layer and ether extracts were then combined and submitted to fractional distillation under reduced pressure to recover the solvent and unreacted starting materials and to separate a parachlorophenyl 1,1-dichloro-2-methyl-1-propene product boiling at 91° to 97° C. under a pressure of 0.3 millimeter.

In a similar fashion, 1,1,1,2-tetrachloro-2-methylpropane is reacted in the presence of a catalytic amount of aluminum chloride with bromobenzene, toluene, m-xylene, or tertiarybutylbenzene to produce p-bromophenyl 1,1-dichloro-2-methylpropene, p-tolyl-1,1-dichloro-2-methyl-1-propene, 2,4-dimethylphenyl-1,1-dichloro-2-methyl-1-propene or p-tertiarybutylphenyl-1,1-dichloro-2-methyl-1-propene, respectively.

A preferred embodiment of the invention comprises reacting 1,1,1,2-tetrachloro-2-methylpropane in the presence of a catalytic amount of anhydrous aluminum chloride with a compound of the formula

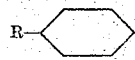

wherein R represents bromine, chlorine or a lower alkyl radical of from 1 to 4 carbon atoms, inclusive, to produce a compound of the formula

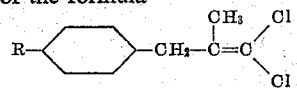

wherein R has the significance as set forth above.

The aryl-dichloro-methylpropene products may be dissolved in xylene together with a non-ionic emulsifying agent to prepare emulsifiable concentrates adapted to be dispersed in water for producing aqueous spray compositions. These compositions are effective for the control of mite and aphid pests on vegetation.

We claim:
1. A method for preparing compounds having the formula

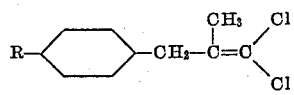

wherein R is selected from the group consisting of chlorine, bromine and lower alkyl radicals of from 1 to 4 carbon atoms, inclusive, which comprises reacting 1,1,1,2-tetrachloro-2-methylpropane with a compound of the formula

wherein R has the significance as set forth above, said reaction being carried out in the presence of a catalytic amount of anhydrous aluminum chloride and at a temperature of from about 70° to 100° C.

2. A method according to claim 1 in which the anhydrous aluminum chloride is employed in the amount of 0.01 to 0.1 mole per mole of 1,1,1,2-tetrachloro-2-methyl-1-propene in the reaction.

3. A method for the preparation of 3-(parachlorophenyl)-1,1-dichloro-2-methyl-1-propene which comprises reacting 1,1,1,2-tetrachloro-2-methylpropane with chlorobenzene in the presence of a catalytic amount of anhydrous aluminum chloride and at a temperature of from about 70° to 100° C.

4. A method for the preparation of 3-(parabromophenyl)-1,1-dichloro-2-methyl-1-propene which comprises reacting 1,1,1,2-tetrachloro-2-methylpropane with bromobenzene in the presence of a catalytic amount of anhydrous aluminum chloride and at a temperature of from about 70° to 100° C.

5. A method for the preparation of 3-(paratolyl)-1,1-dichloro-2-methyl-1-propene which comprises reacting 1,1,1,2-tetrachloro-2-methylpropane with toluene in the presence of a catalytic amount of anhydrous aluminum chloride and at a temperature of from about 70° to 100° C.

6. A method for the preparation of 3-(paratertiarybutylphenyl)-1,1-dichloro-2-methyl-1-propene which comprises reacting 1,1,1,2-tetrachloro-2-methylpropane with tertiarybutylbenzene in the presence of a catalytic amount of anhydrous aluminum chloride and at a temperature of from about 70° to 100° C.

References Cited in the file of this patent
UNITED STATES PATENTS

| | | |
|---|---|---|
| 2,410,541 | Joyce | Nov. 5, 1946 |
| 2,485,017 | Schmerling | Oct. 18, 1949 |

OTHER REFERENCES

Huntress, "Organic Chlorine Compounds," pp. 728–9, (1948).